(12) United States Patent
Chan

(10) Patent No.: US 10,790,752 B1
(45) Date of Patent: Sep. 29, 2020

(54) POWER SUPPLY DEVICE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/520,524

(22) Filed: Jul. 24, 2019

(30) Foreign Application Priority Data

May 7, 2019 (TW) .............................. 108115672 A

(51) Int. Cl.
| | | |
|---|---|---|
| H02M 3/335 | (2006.01) | |
| H02M 1/32 | (2007.01) | |
| H02H 7/10 | (2006.01) | |
| H02M 1/36 | (2007.01) | |
| H02M 1/00 | (2006.01) | |

(52) U.S. Cl.
CPC ... *H02M 3/33523* (2013.01); *H02M 3/33576* (2013.01); *H02H 7/10* (2013.01); *H02M 1/32* (2013.01); *H02M 1/36* (2013.01); *H02M 2001/0096* (2013.01)

(58) Field of Classification Search
CPC ......... H02M 3/33523; H02M 3/33576; H02M 1/32; H02M 1/36; H02M 2001/0096; H02H 7/10
See application file for complete search history.

(56) References Cited

U.S. PATENT DOCUMENTS 5,818,707 A * 10/1998 Seong .................. H02M 1/4225
363/89
8,213,194 B2 * 7/2012 Koutensky ......... H05B 33/0815
315/209 R
9,401,647 B2 * 7/2016 Kuang .............. H02M 3/33507
(Continued)

FOREIGN PATENT DOCUMENTS

| CN | 1396699 A | 2/2003 |
|---|---|---|
| CN | 103744803 A | 4/2014 |

(Continued)

OTHER PUBLICATIONS

Chinese language office action dated May 15, 2020, issued in application No. TW 108115672.

*Primary Examiner* — Kyle J Moody
(74) *Attorney, Agent, or Firm* — McClure, Qualey & Rodack, LLP

(57) ABSTRACT

A power supply device includes a voltage dividing circuit, a first transformer, a comparator, a second transformer, and an output stage circuit. The voltage dividing circuit generates a reference voltage according to an input voltage. The first transformer generates a transformation voltage and a feedback voltage according to the input voltage. The comparator compares the feedback voltage with the reference voltage to generate a comparison voltage. The second transformer generates a control voltage according to the comparison voltage. The output stage circuit selectively generates an output voltage according to the transformation voltage and the control voltage. If the RMS (Root-Mean-Square) value of the input voltage is higher than or equal to a threshold voltage, the output stage circuit will continuously output the output voltage. If the RMS value of the input voltage is lower than the threshold voltage, the output stage circuit will stop outputting the output voltage.

14 Claims, 5 Drawing Sheets

(56) References Cited

U.S. PATENT DOCUMENTS

| | | | | |
|---|---|---|---|---|
| 9,998,113 B2* | 6/2018 | Fujii | ............... | H03K 17/223 |
| 10,097,094 B2* | 10/2018 | Chen | ............... | H02M 1/00 |
| 10,277,131 B2* | 4/2019 | Zhang | ............... | H02M 3/33507 |
| 10,483,861 B1* | 11/2019 | Feng | ............... | H02M 3/33569 |
| 2004/0263140 A1* | 12/2004 | Adragna | ............... | G05F 1/70 |
| | | | | 323/282 |
| 2006/0050449 A1* | 3/2006 | Wu | ............... | H02M 1/32 |
| | | | | 361/18 |
| 2013/0088897 A1* | 4/2013 | Adragna | ............... | H02M 3/33507 |
| | | | | 363/21.12 |
| 2014/0043867 A1* | 2/2014 | Sugawara | ............... | H02M 3/33507 |
| | | | | 363/21.15 |
| 2015/0055972 A1 | 2/2015 | Kosaka | | |
| 2015/0188437 A1 | 7/2015 | Chan | | |
| 2018/0102709 A1* | 4/2018 | Hari | ............... | H02M 3/33523 |
| 2019/0074761 A1 | 3/2019 | Matsuda | | |
| 2019/0252983 A1 | 8/2019 | Tian et al. | | |

FOREIGN PATENT DOCUMENTS

| | | |
|---|---|---|
| TW | 1389437 B | 3/2013 |
| TW | 201526513 A | 7/2015 |
| TW | I545867 B | 8/2016 |
| TW | 201916565 A | 4/2019 |

\* cited by examiner

US 10,790,752 B1

POWER SUPPLY DEVICE

CROSS REFERENCE TO RELATED APPLICATIONS

This Application claims priority of Taiwan Patent Application No. 108115672 filed on May 7, 2019, the entirety of which is incorporated by reference herein.

BACKGROUND OF THE INVENTION

Field of the Invention

The disclosure generally relates to a power supply device, and more specifically, to a power supply device for increasing output stability.

Description of the Related Art

When an electronic device is supplied with power by an external power source, an unwanted "voltage dip" or "short interruption" may occur if the external power source is not stable enough. FIG. 1 is a diagram of the relationship between the input voltage of an external power source and time. As shown in FIG. 1, during the first time period T1, the input voltage of the external power source drops by about 30%: this is considered as the aforementioned voltage dip. During the second time period T2, the input voltage of the external power source drops by about 100%, and this is considered as the aforementioned short interruption.

A conventional power supply device usually provides a very short holding-up time when a voltage dip happens in the external power source. Thus, the conventional power supply device cannot meet the requirements set by the IEC (International Electro Technical Commission). Accordingly, there is a need to propose a novel solution for overcoming the problems of the prior art.

BRIEF SUMMARY OF THE INVENTION

In a preferred embodiment, the invention is directed to a power supply device which includes a voltage dividing circuit, a first transformer, a comparator, a second transformer, and an output stage circuit. The voltage dividing circuit generates a reference voltage according to an input voltage. The first transformer generates a transformation voltage and a feedback voltage according to the input voltage. The comparator compares the feedback voltage with the reference voltage, so as to generate a comparison voltage. The second transformer generates a control voltage according to the comparison voltage. The output stage circuit selectively generates an output voltage according to the transformation voltage and the control voltage. If the RMS (Root-Mean-Square) of the input voltage is higher than or equal to a threshold voltage, the output stage circuit will continuously output the output voltage. If the RMS value of the input voltage is lower than the threshold voltage, the output stage circuit will stop outputting the output voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
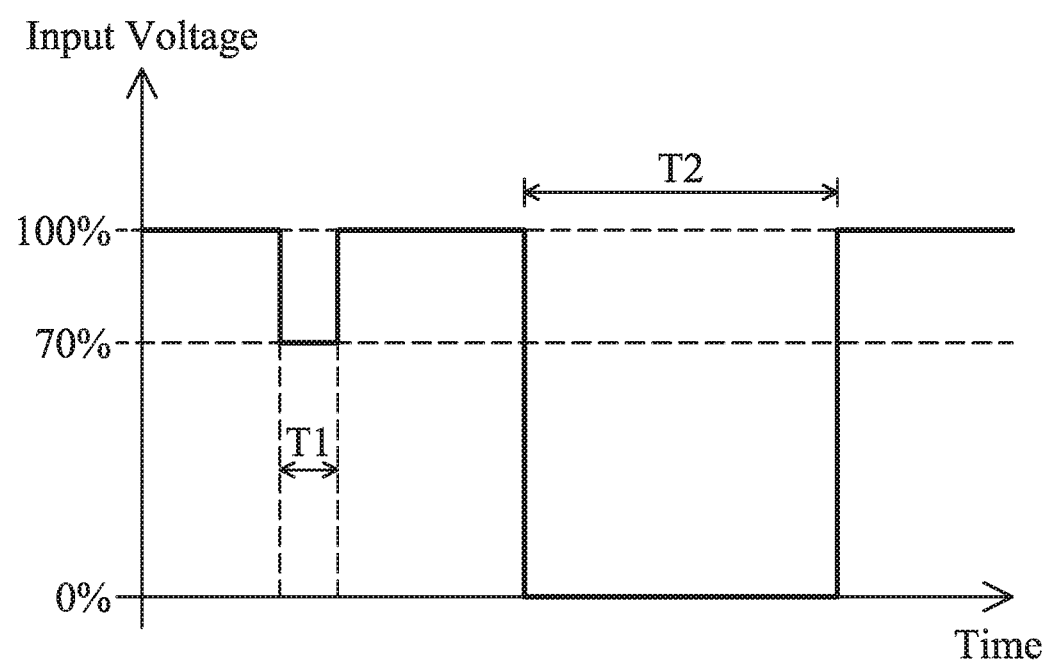
FIG. 1 is a diagram of the relationship between an input voltage of an external power source and time.
Figure 2:
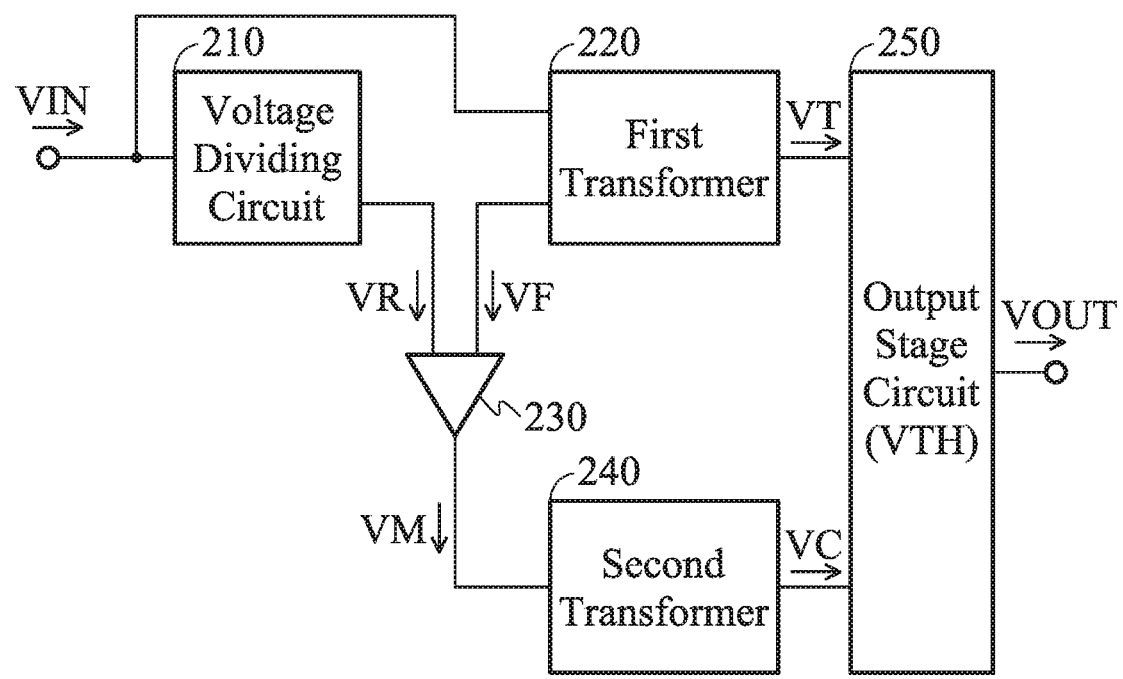
FIG. 2 is a diagram of a power supply device according to an embodiment of the invention.

FIG. 2 is a diagram of a power supply device 200 according to an embodiment of the invention. For example, the power supply device 200 may be applied to a desktop computer, a notebook computer, or an all-in-one computer. As shown in FIG. 2, the power supply device 200 includes a voltage dividing circuit 210, a first transformer 220, a comparator 230, a second transformer 240, and an output stage circuit 250. The voltage dividing circuit 210 generates a reference voltage VR according to an input voltage VIN. The reference voltage VR may be equal to a specific percentage of the input voltage VIN (e.g., 30%, 40%, 50% or 60%). The input voltage VIN may be from an external power source. The input voltage VIN may be an AC (Alternating Current) voltage with any frequency and any magnitude. For example, the frequency of the input voltage VIN may be about 60 Hz, and the RMS (Root-Mean-Square) value of the input voltage VIN may be about 110V or 220V, but they are not limited thereto. The first transformer 220 generates a transformation voltage VT and a feedback voltage VF according to the input voltage VIN. The comparator 230 compares the feedback voltage VF with the reference voltage VR, so as to generate a comparison voltage VM. The second transformer 240 generates a control voltage VC according to the comparison voltage VM. The output stage circuit 250 selectively generates an output voltage VOUT according to the transformation voltage VT and the control voltage VC. The output voltage VOUT may be a DC (Direct Current) voltage with any voltage level. For example, the voltage level of the output voltage VOUT may be constant 19V, but it is not limited thereto. Specifically, if the RMS value of the input voltage VIN is higher than or equal to a threshold voltage VTH, the output stage circuit 250 will continuously output the output voltage VOUT; conversely, if the RMS value of the input voltage VIN is lower than the threshold voltage VTH, the output stage circuit 250 will stop outputting the output voltage VOUT. In some embodiments, the threshold voltage VTH is set to a predetermined percentage of the maximum RMS value of the input voltage VIN. The predetermined percentage may be lower than 70%, such as 60%, 50% or 40%, but it is not limited thereto. If the maximum RMS value of the input voltage VIN is 100V, the threshold voltage VTH may be 60V, 50V or 40V. According to practical measurements, such a circuit design can increase the output stability of the power supply device 200. It should be noted that the power supply device 200 may further include other components, such as a voltage regulator and/or a negative feedback circuit, although they are not displayed in FIG. 2.

The following embodiments will introduce the detailed structure and operation of the power supply device 200. It should be understood these figures and descriptions are merely exemplary, rather than limitations of the invention.

Figure 3:
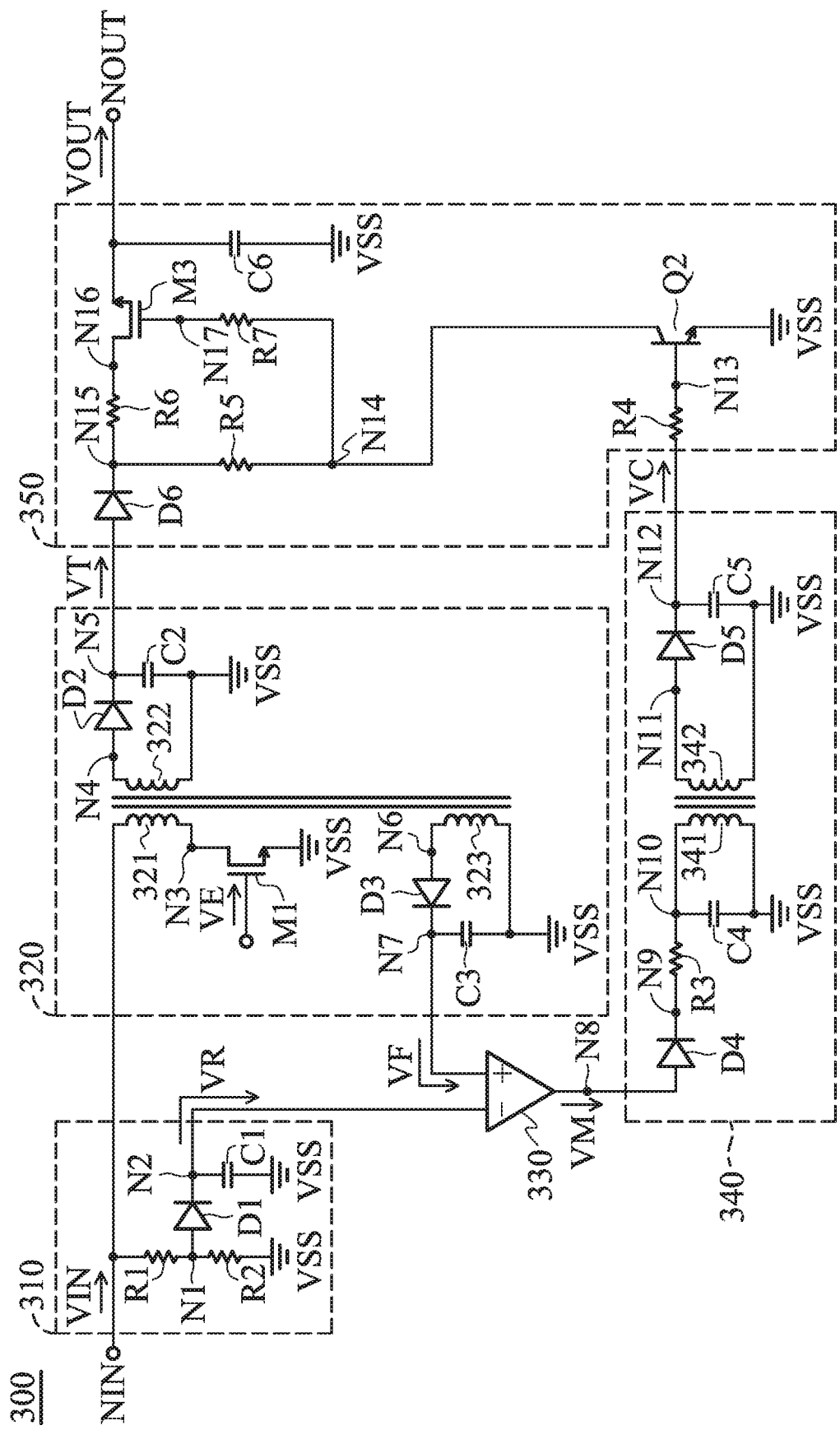
FIG. 3 is a diagram of a power supply device according to an embodiment of the invention.

FIG. 3 is a diagram of a power supply device 300 according to an embodiment of the invention. In the embodiment of FIG. 3, the power supply device 300 with an input node NIN and an output node NOUT includes a voltage dividing circuit 310, a first transformer 320, a comparator 330, a second transformer 340, and an output stage circuit 350. The input node NIN of the power supply device 300 is arranged for receiving an input voltage VIN from an external power source. The output node NOUT of the power supply device 300 is arranged for outputting an output voltage VOUT to an electronic device (e.g., a notebook computer).

The voltage dividing circuit 310 includes a first resistor R1, a second resistor R2, a first diode D1, and a first capacitor C1. The first resistor R1 has a first terminal coupled to the input node NIN for receiving the input voltage VIN, and a second terminal coupled to a first node N1. The second resistor R2 has a first terminal coupled to the first node N1, and a second terminal coupled to a ground voltage VSS (e.g., 0V). The first diode D1 has an anode coupled to the first node N1, and a cathode coupled to a second node N2 for outputting a reference voltage VR. The first capacitor C1 has a first terminal coupled to the second node N2, and a second terminal coupled to the ground voltage VSS.

The first transformer 320 includes a first main coil 321, a first secondary coil 322, an auxiliary coil 323, a second diode D2, a third diode D3, a second capacitor C2, a third capacitor C3, and a first transistor M1. The first main coil 321 and the auxiliary coil 323 may be positioned at the same side of the first transformer 320. The first secondary coil 322 may be positioned at the opposite side of the first transformer 320. The first main coil 321 has a first terminal coupled to the input node NIN for receiving the input voltage VIN, and a second terminal coupled to a third node N3. The first secondary coil 322 has a first terminal coupled to a fourth node N4, and a second terminal coupled to the ground voltage VSS. The first transistor M1 may be an NMOS transistor (N-type Metal Oxide Semiconductor Field Effect Transistor). The first transistor M1 has a control terminal (or a gate) for receiving an external control voltage VE, a first terminal (or a source) coupled to the ground voltage VSS, and a second terminal (or a drain) coupled to the third node N3. For example, the external control voltage VE may be a clock or a DC voltage. The second diode D2 has an anode coupled to the fourth node N4, and a cathode coupled to a fifth node N5 for outputting a transformation voltage VT. The second capacitor C2 has a first terminal coupled to the fifth node N5, and a second terminal coupled to the ground voltage VSS. The auxiliary coil 323 has a first terminal coupled to a sixth node N6, and a second terminal coupled to the ground voltage VSS. The third diode D3 has an anode coupled to the sixth node N6, and a cathode coupled to a seventh node N7 for outputting a feedback voltage VF. The third capacitor C3 has a first terminal coupled to the seventh node N7, and a second terminal coupled to the ground voltage VSS.

The comparator 330 has a positive input terminal for receiving the feedback voltage VF, a negative input terminal for receiving the reference voltage VR, and an output terminal coupled to an eighth node N8 for outputting a comparison voltage VM.

The second transformer 340 includes a second main coil 341, a second secondary coil 342, a third resistor R3, a fourth diode D4, a fifth diode D5, a fourth capacitor C4, and a fifth capacitor C5. The fourth diode D4 has an anode coupled to the eighth node N8 for receiving the comparison voltage VM, and a cathode coupled to a ninth node N9. The third resistor R3 has a first terminal coupled to the ninth node N9, and a second terminal coupled to a tenth node N10. The fourth capacitor C4 has a first terminal coupled to the tenth node N10, and a second terminal coupled to the ground voltage VSS. A low-pass filter may be formed by the third resistor R3 and the fourth capacitor C4. The second main coil 341 has a first terminal coupled to the tenth node N10, and a second terminal coupled to the ground voltage VSS. The second secondary coil 342 has a first terminal coupled to an eleventh node N11, and a second terminal coupled to the ground voltage VSS. The fifth diode D5 has an anode coupled to the eleventh node N11, and a cathode coupled to a twelfth node N12 for outputting a control voltage VC. The fifth capacitor C5 has a first terminal coupled to the twelfth node N12, and a second terminal coupled to the ground voltage VSS.

The output stage circuit 350 includes a fourth resistor R4, a fifth resistor R5, a sixth resistor R6, a seventh resistor R7, a sixth diode D6, a sixth capacitor C6, a second transistor Q2, and a third transistor M3. The fourth resistor R4 has a first terminal coupled to the twelfth node N12 for receiving the control voltage VC, and a second terminal coupled to a thirteenth node N13. The second transistor Q2 may be an NPN-type BJT (Bipolar Junction Transistor). The second transistor Q2 has a control terminal (or a base) coupled to the thirteenth node N13, a first terminal (or an emitter) coupled to the ground voltage VSS, and a second terminal (or a collector) coupled to a fourteenth node N14. The sixth diode D6 has an anode coupled to the fifth node N5 for receiving the transformation voltage VT, and a cathode coupled to a fifteenth node N15. The fifth resistor R5 has a first terminal coupled to the fifteenth node N15, and a second terminal coupled to the fourteenth node N14. The sixth resistor R6 has a first terminal coupled to the fifteenth node N15, and a second terminal coupled to a sixteenth node N16. The seventh resistor R7 has a first terminal coupled to the fourteenth node N14, and a second terminal coupled to a seventeenth node N17. The third transistor M3 may be an NMOS transistor. The third transistor M3 has a control terminal (or a gate) coupled to the seventeenth node N17, a first terminal (or a source) coupled to the output node NOUT for outputting the output voltage VOUT, and a second terminal (or a drain) coupled to the sixteenth node N16. The sixth capacitor C6 has a first terminal coupled to the output node NOUT, and a second terminal coupled to the ground voltage VSS.

The operation principles of the power supply device 300 are described as follows. The comparator 330, the second transistor Q2, and the third transistor M3 may be main switch elements of the power supply device 300, and they determine whether to output the output voltage VOUT. The first transformer 320 provides a negative feedback mechanism for tuning the switching operation of the comparator 330. Generally, if the RMS value of the input voltage VIN is higher than or equal to a threshold voltage VTH, the feedback voltage VF will drop down below the reference voltage VR, and the comparator 330 will generate the comparison voltage VM at a low logic level. The second transformer 340 may generate the control voltage VC at a low logic level according to the comparison voltage VM, so as to disable the second transistor Q2 and enable the third transistor M3. Thus, the output stage circuit 350 can continuously output the output voltage VOUT. Conversely, if the RMS value of the input voltage VIN is lower than the threshold voltage VTH, the feedback voltage VF will rise up above the reference voltage VR, and the comparator 330 will generate the control voltage VC at a high logic level, so as to enable the second transistor Q2. The enabled second transistor Q2 can pull down the voltage at the seventeenth node N17, so as to disable the third transistor M3. Thus, the output stage circuit 350 can stop outputting the output voltage VOUT. It should be noted that the threshold voltage VTH is relative to the setting of the reference voltage VR. By changing the resistance ratio of the first resistor R1 to the second resistor R2 (i.e., the divider ratio of the voltage dividing circuit 310), a designer can freely adjust the reference voltage VR and its corresponding threshold voltage VTH. In some embodiments, the threshold voltage VTH is equal to a predetermined percentage of the maximum RMS value of the input voltage VIN, and the predetermined percentage is lower than 70%. For example, if the maximum RMS value of the input voltage VIN is 100V, the threshold voltage VTH may be set to 60V (below 70V), but it is not limited thereto.

Figure 4A:
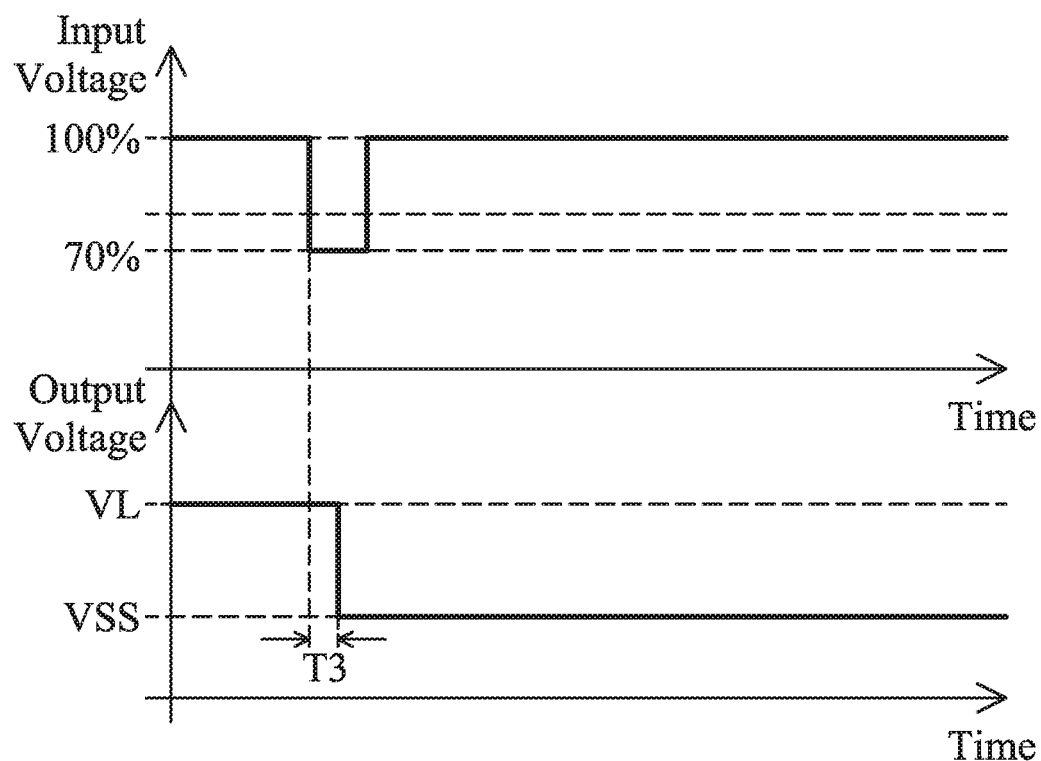
FIG. 4A is a diagram of voltage waveforms of a conventional power supply device.
Figure 4B:
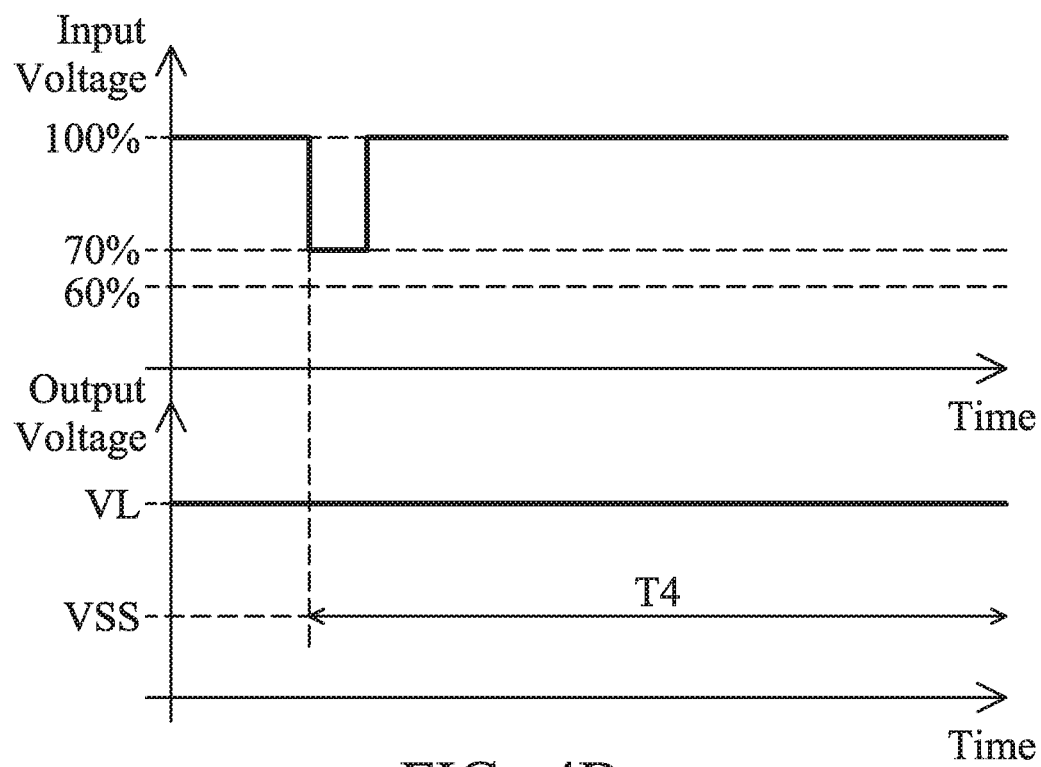
FIG. 4B is a diagram of voltage waveforms of a power supply device according to an embodiment of the invention.

If the frequency of the input voltage VIN is 60 Hz and the maximum RMS value of the input voltage VIN is 100V, the output characteristic of the proposed power supply device 300 will be compared to that of the conventional power supply device in FIG. 4A and FIG. 4B.

FIG. 4A is a diagram of voltage waveforms of a conventional power supply device. As shown in FIG. 4A, with the conventional design, the output voltage VOUT quickly drops from a fixed voltage level VL down to 0V (i.e., the ground voltage VSS) when the voltage dip happens to the external power source and the input voltage VIN merely reaches 70% of its maximum RMS value. According to the measurement of FIG. 4A, the holding-up time T3 of the conventional power supply device may be only about 10 ms in response to the testing of the voltage dip (the test duration is about 17 ms), and it cannot meet the requirements of general application.

FIG. 4B is a diagram of voltage waveforms of the power supply device 300 according to an embodiment of the invention. As shown in FIG. 4B, with the design of the invention, the output voltage VOUT can be maintained at the fixed voltage level VL without any drop when the voltage dip happens to the external power source and the input voltage VIN merely reaches 70% of its maximum RMS value (because the input voltage VIN is still higher than 60% of its maximum RMS value). According to the measurement of FIG. 4B, the holding-up time T4 of the power supply device 300 of the invention approaches infinity in response to the testing of the voltage dip (the test duration is about 17 ms). It should be noted that the proposed power supply device 300 will not be negatively affected by the voltage dip if the threshold voltage VTH is appropriately controlled.

In some embodiments, the element parameters of the power supply device 300 are described as follows. The resistance of the first resistor R1 may be from 380 kΩ to 420 kΩ, such as 400 kΩ. The resistance of the second resistor R2 may be from 570 kΩ to 630 kΩ, such as 600 kΩ. The resistance of the third resistor R3 may be from 9.5 kΩ to 10.5 kΩ such as 10 kΩ. The resistance of the fourth resistor R4 may be from 9.5 kΩ to 10.5 kΩ such as 10 kΩ. The resistance of the fifth resistor R5 may be from 9.5 kΩ to 10.5 kΩ such as 10 kΩ. The resistance of the sixth resistor R6 may be from 9.5 kΩ to 10.5 kΩ such as 10 kΩ. The resistance of the seventh resistor R7 may be from 95Ω to 105Ω, such as 100Ω. The capacitance of the first capacitor C1 may be from 42.3 μF to 51.7 μF, such as 47 μF. The capacitance of the second capacitor C2 may be from 42.3 μF to 51.7 μF, such as 47 μF. The capacitance of the third capacitor C3 may be from 42.3 μF to 51.7 μF, such as 47 μF. The capacitance of the fourth capacitor C4 may be from 0.95 nF to 1.05 nF, such as 1 nF. The capacitance of the fifth capacitor C5 may be from 42.3 μF to 51.7 μF, such as 47 μF. The capacitance of the sixth capacitor C6 may be from 612 μF to 748 μF, such as 680 μF. The turn ratio of the first main coil 321 to the first secondary coil 322 may be from 1 to 10, such as 5. The turn ratio of the first main coil 321 to the auxiliary coil 323 may be from 1 to 10, such as 5. The turn ratio of the second main coil 341 to the second secondary coil 342 may be from 0.5 to 2, such as 1. The above ranges of parameters are calculated and obtained according to the results of many experiments, and they help to optimize the transformation efficiency and holding-up time of the power supply device 300.

Figure 5:
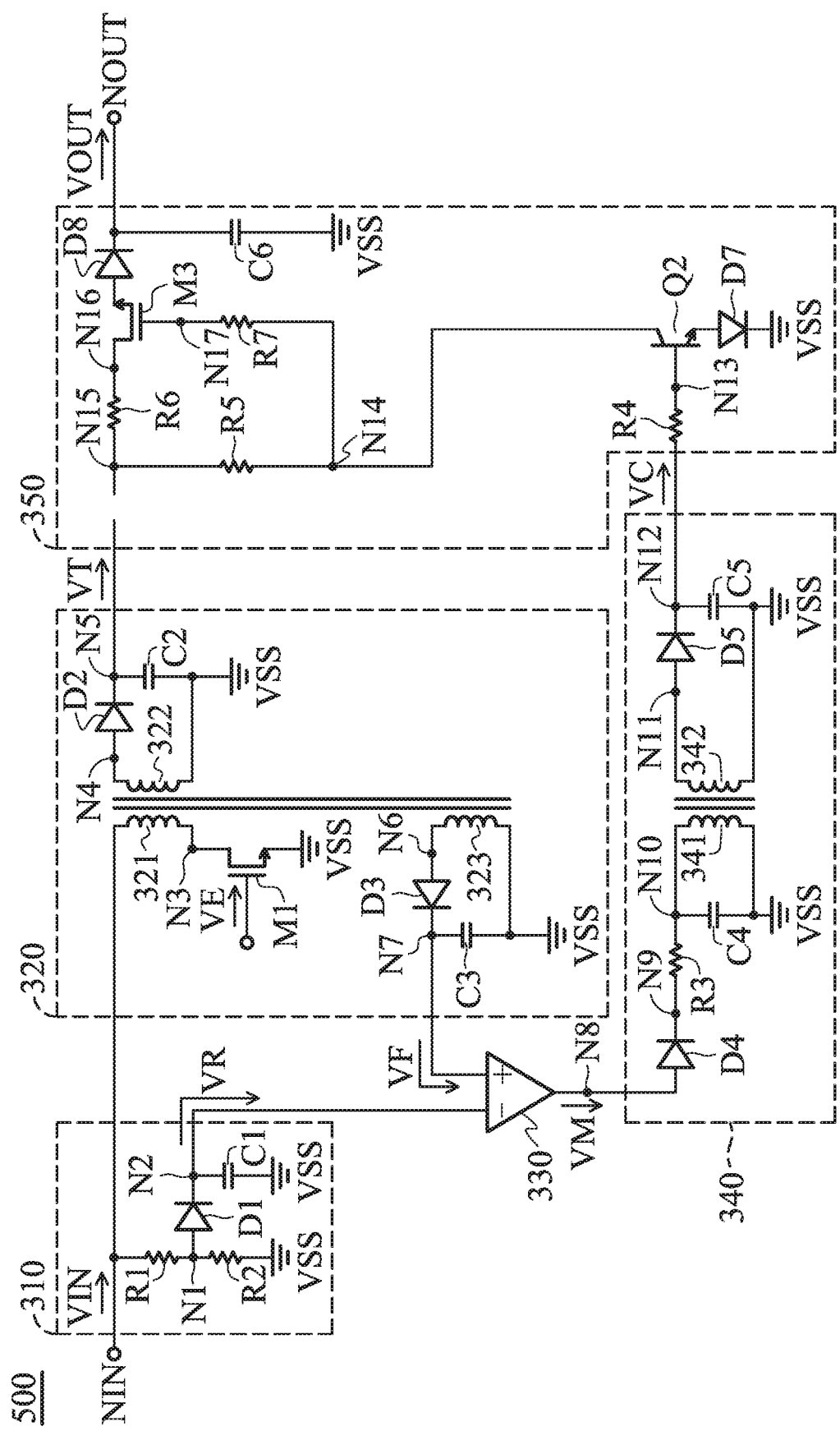
FIG. 5 is a diagram of a power supply device according to another embodiment of the invention.

FIG. 5 is a diagram of a power supply device 500 according to another embodiment of the invention. FIG. 5 is similar to FIG. 3. In the embodiment of FIG. 5, the power supply device 500 further includes a seventh diode D7 and an eighth diode D8. The seventh diode D7 has an anode coupled to the first terminal of the second transistor Q2, and a cathode coupled to the ground voltage VSS. The eighth diode D8 has an anode coupled to the first terminal of the third transistor M3, and a cathode coupled to the output node NOUT. The incorporation of the seventh diode D7 and the eighth diode D8 can reject non-ideal reverse currents in the power supply device 500, so as to increase the reliability of the power supply device 500. Other features of the power supply device 500 of FIG. 5 are similar to those of the power supply device 300 of FIG. 3. Accordingly, the two embodiments can achieve similar levels of performance.

The invention proposes a novel power supply device which includes a comparator for automatically switching different output modes. According to practical measurements, the proposed power supply device using the aforementioned comparator has a longer holding-up time and meets the requirements of IEC (International Electro Technical Commission). Generally, the invention has higher output stability than the conventional design, and it is suitable for application in a variety of electronic devices.

Note that the above voltages, currents, resistances, inductances, capacitances and other element parameters are not limitations of the invention. A designer can adjust these parameters according to different requirements. The power supply device of the invention is not limited to the configurations of FIGS. 1-5. The invention may merely include any one or more features of any one or more embodiments of FIGS. 1-5. In other words, not all of the features displayed in the figures should be implemented in the power supply circuit of the invention. Although the embodiments of the invention use MOSFET and BJT as examples, the invention is not limited thereto, and those skilled in the art may use other types of transistors, such as JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A power supply device, comprising:
   a voltage dividing circuit, generating a reference voltage according to an input voltage;
   a first transformer, generating a transformation voltage and a feedback voltage according to the input voltage;
   a comparator, comparing the feedback voltage with the reference voltage, so as to generate a comparison voltage;
   a second transformer, generating a control voltage according to the comparison voltage; and
   an output stage circuit, selectively generating an output voltage according to the transformation voltage and the control voltage;
   wherein if an RMS (Root-Mean-Square) value of the input voltage is higher than or equal to a threshold voltage, the output stage circuit continuously outputs the output voltage, and wherein if the RMS value of the input voltage is lower than the threshold voltage, the output stage circuit stops outputting the output voltage;
   wherein the voltage dividing circuit comprises:
   a first resistor, wherein the first resistor has a first terminal coupled to an input node for receiving the input voltage, and a second terminal coupled to a first node;
   a second resistor, wherein the second resistor has a first terminal coupled to the first node, and a second terminal coupled to a ground voltage;
   a first diode, wherein the first diode has an anode coupled to the first node, and a cathode coupled to a second node for outputting the reference voltage; and
   a first capacitor, wherein the first capacitor has a first terminal coupled to the second node, and a second terminal coupled to the ground voltage.

2. The power supply device as claimed in claim 1, wherein the first transformer comprises:
   a first main coil, wherein the first main coil has a first terminal coupled to the input node for receiving the input voltage, and a second terminal coupled to a third node; and
   a first secondary coil, wherein the first secondary coil has a first terminal coupled to a fourth node, and a second terminal coupled to the ground voltage.

3. The power supply device as claimed in claim 2, wherein the first transformer further comprises:
   a first transistor, wherein the first transistor has a control terminal for receiving an external control voltage, a first terminal coupled to the ground voltage, and a second terminal coupled to the third node;
   a second diode, wherein the second diode has an anode coupled to the fourth node, and a cathode coupled to a fifth node for outputting the transformation voltage; and
   a second capacitor, wherein the second capacitor has a first terminal coupled to the fifth node, and a second terminal coupled to the ground voltage.

4. The power supply device as claimed in claim 3, wherein the first transformer further comprises:
   an auxiliary coil, wherein the auxiliary coil has a first terminal coupled to a sixth node, and a second terminal coupled to the ground voltage.

5. The power supply device as claimed in claim 4, wherein the first transformer further comprises:
   a third diode, wherein the third diode has an anode coupled to the sixth node, and a cathode coupled to a seventh node for outputting the feedback voltage; and
   a third capacitor, wherein the third capacitor has a first terminal coupled to the seventh node, and a second terminal coupled to the ground voltage.

6. The power supply device as claimed in claim 5, wherein the comparator has a positive input terminal for receiving the feedback voltage, a negative input terminal for receiving the reference voltage, and an output terminal coupled to an eighth node for outputting the comparison voltage.

7. The power supply device as claimed in claim 6, wherein the second transformer comprises:
   a fourth diode, wherein the fourth diode has an anode coupled to the eighth node for receiving the comparison voltage, and a cathode coupled to a ninth node;
   a third resistor, wherein the third resistor has a first terminal coupled to the ninth node, and a second terminal coupled to a tenth node; and
   a fourth capacitor, wherein the fourth capacitor has a first terminal coupled to the tenth node, and a second terminal coupled to the ground voltage.

8. The power supply device as claimed in claim 7, wherein the second transformer further comprises:
   a second main coil, wherein the second main coil has a first terminal coupled to the tenth node, and a second terminal coupled to the ground voltage.

9. The power supply device as claimed in claim 8, wherein the second transformer further comprises:
   a second secondary coil, wherein the second secondary coil has a first terminal coupled to an eleventh node, and a second terminal coupled to the ground voltage.

10. The power supply device as claimed in claim 9, wherein the second transformer further comprises:
    a fifth diode, wherein the fifth diode has an anode coupled to the eleventh node, and a cathode coupled to a twelfth node for outputting the control voltage; and
    a fifth capacitor, wherein the fifth capacitor has a first terminal coupled to the twelfth node, and a second terminal coupled to the ground voltage.

11. The power supply device as claimed in claim 10, wherein the output stage circuit comprises:
    a fourth resistor, wherein the fourth resistor has a first terminal coupled to the twelfth node for receiving the control voltage, and a second terminal coupled to a thirteenth node; and
    a second transistor, wherein the second transistor has a control terminal coupled to the thirteenth node, a first terminal coupled to the ground voltage, and a second terminal coupled to a fourteenth node.

12. The power supply device as claimed in claim 11, wherein the output stage circuit further comprises:
a sixth diode, wherein the sixth diode has an anode coupled to the fifth node for receiving the transformation voltage, and a cathode coupled to a fifteenth node;
a fifth resistor, wherein the fifth resistor has a first terminal coupled to the fifteenth node, and a second terminal coupled to the fourteenth node;
a sixth resistor, wherein the sixth resistor has a first terminal coupled to the fifteenth node, and a second terminal coupled to a sixteenth node;
a seventh resistor, wherein the seventh resistor has a first terminal coupled to the fourteenth node, and a second terminal coupled to a seventeenth node;
a third transistor, wherein the third transistor has a control terminal coupled to the seventeenth node, a first terminal coupled to the output node for outputting the output voltage, and a second terminal coupled to the sixteenth node; and
a sixth capacitor, wherein the sixth capacitor has a first terminal coupled to the output node, and a second terminal coupled to the ground voltage.

13. The power supply device as claimed in claim 11, wherein the output stage circuit further comprises:

a seventh diode, wherein the seventh diode has an anode coupled to the first terminal of the second transistor, and a cathode coupled to the ground voltage; and
an eighth diode, wherein the eighth diode has an anode coupled to the first terminal of the third transistor, and a cathode coupled to the output node.

14. A power supply device, comprising:
a voltage dividing circuit, generating a reference voltage according to an input voltage;
a first transformer, generating a transformation voltage and a feedback voltage according to the input voltage;
a comparator, comparing the feedback voltage with the reference voltage, so as to generate a comparison voltage;
a second transformer, generating a control voltage according to the comparison voltage; and
an output stage circuit, selectively generating an output voltage according to the transformation voltage and the control voltage;
wherein if an RMS (Root-Mean-Square) value of the input voltage is higher than or equal to a threshold voltage, the output stage circuit continuously outputs the output voltage, and wherein if the RMS value of the input voltage is lower than the threshold voltage, the output stage circuit stops outputting the output voltage;
wherein the second transformer is independent of the first transformer.

* * * * *